United States Patent
Herzig et al.

(10) Patent No.: US 6,274,692 B1
(45) Date of Patent: Aug. 14, 2001

(54) CROSS-LINKABLE COMPOUNDS, OPTIONALLY CONTAINING MQ SILICON RESINS

(75) Inventors: Christian Herzig, Waging am See; Oliver Zoellner, Simbach am Inn; Friedrich Hockemeyer, Marktl am Inn; Robert Banfic, Burgkirchen, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/381,414

(22) PCT Filed: Mar. 19, 1998

(86) PCT No.: PCT/EP98/01597

§ 371 Date: Sep. 30, 1999

§ 102(e) Date: Sep. 30, 1999

(87) PCT Pub. No.: WO98/42789

PCT Pub. Date: Oct. 1, 1999

(30) Foreign Application Priority Data

Mar. 20, 1997 (DE) .............................. 197 11 694
Mar. 20, 1997 (DE) .............................. 197 11 695

(51) Int. Cl.$^7$ .............................. C08G 77/20; B05P 3/02
(52) U.S. Cl. .............................. 528/32; 528/15; 528/31; 528/33; 427/387; 525/474; 525/477; 525/478; 556/434; 556/435; 556/453
(58) Field of Search .............................. 528/15, 31, 32, 528/33; 556/434, 435, 453; 525/474, 477, 478; 427/387

(56) References Cited

U.S. PATENT DOCUMENTS

| | | |
|---|---|---|
| 2,476,166 | 7/1949 | Wayo . |
| 3,436,366 * | 4/1969 | Modic . |
| 3,445,420 | 5/1969 | Kookootsedes et al. . |
| 3,882,083 * | 5/1975 | Berger et al. . |
| 4,041,010 * | 8/1977 | Jeram . |
| 4,123,604 | 10/1978 | Sandford, Jr. . |
| 4,242,486 | 12/1980 | August et al. . |
| 4,292,434 | 9/1981 | Lindner et al. . |
| 4,504,645 | 3/1985 | Melancon . |
| 4,529,553 * | 7/1985 | Faltynek ................... 556/12 |
| 4,529,789 * | 7/1985 | Kroupa ................... 528/15 |
| 4,535,141 * | 8/1985 | Kroupa ................... 528/15 |
| 4,845,164 * | 7/1989 | Gutek ................... 528/15 |
| 4,988,779 * | 1/1991 | Medford et al. ................ 525/478 |
| 5,034,061 * | 7/1991 | Maguire et al. ................ 106/287.14 |
| 5,057,549 | 10/1991 | Herzig et al. . |
| 5,077,369 | 12/1991 | de Montigny et al. . |
| 5,082,915 | 1/1992 | Hara et al. . |
| 5,122,562 * | 6/1992 | Jeram et al. ................ 524/403 |
| 5,446,087 | 8/1995 | Chizat et al. . |
| 5,468,815 * | 11/1995 | Boardman et al. ................ 525/478 |
| 5,677,411 * | 10/1997 | Ward et al. ................ 528/15 |
| 5,691,435 | 11/1997 | Herzig et al. . |
| 5,708,075 * | 1/1998 | Chung et al. ................ 524/765 |

FOREIGN PATENT DOCUMENTS

| | | |
|---|---|---|
| 2 157 455 A1 | 4/1996 | (CA) . |
| 39 14 896 A1 | 11/1990 | (DE) . |
| 41 28 932 A1 | 3/1993 | (DE) . |
| 44 36 817 A1 | 4/1996 | (DE) . |
| 0 005 787 A1 | 12/1979 | (EP) . |
| 0 110 370 B1 | 6/1984 | (EP) . |
| 0 403 890 B1 | 3/1994 | (EP) . |
| 0 535 687 B1 | 6/1994 | (EP) . |
| 0 601 938 A1 | 6/1994 | (EP) . |
| 0 640 662 A2 | 3/1995 | (EP) . |
| 0 607 869 B1 | 4/1995 | (EP) . |
| 0 761 790 A1 | 3/1997 | (EP) . |

OTHER PUBLICATIONS

Suppliers and Users Technical Manual; Jun. 1980; pp. 21–24.
Derwent Abstract Corresponding to DE–4128932 (AN 1993–077647).
Derwent Abstract Corresponding to EP–640662 (AN 1995–092315 (13)).
Derwent Abstract Corresponding to EP–535687 (AN 1993–110999).
Derwent Abstract Corresponding to EP–607869 (AN 1994–235547 (29)).

* cited by examiner

Primary Examiner—Robert Dawson
Assistant Examiner—Jeffrey B Robertson
(74) Attorney, Agent, or Firm—Brooks & Kushman P.C.

(57) ABSTRACT

The invention relates to new, cross-linkable compounds containing ($A_1$) linear organopolysiloxanes with aliphatically unsaturated hydrocarbon radicals, said organopolysiloxanes being of general formula (I) $R^1{}_a R_{3-a} SiO(R_2SiO)_c [R_2Si-Y-SiR_2O(R_2SiO)_c]_d SiR_{3-b} R^1{}_b$, wherein R can be the same or different, and represents a monovalent, optionally halogenated hydrocarbon radical which is free of terminal aliphatic carbon—carbon multiple bonds, $R^1$ represents a monovalent aliphatically unsaturated hydrocarbon radical, Y represents a bivalent organic radical which is free of terminal aliphatic carbon—carbon multiple bonds, a is 0 or 1, b is 0 or 1, and the sum of a+b per molecule is 1 or 2, c is a whole number to the value of 1 to 1000, d is 0 or a whole number to the value of 1 to 10, and optionally, ($A_2$) MQ silicone resins which are soluble in ($A_1$), on the condition that if MQ silicone resins ($A_2$) are not used, the sum of a+b in the formula (I) is 1.3 to 1.9 on average and that if MQ silicone resins ($A_2$) are used, the sum of a+b in formula (I) is 1.0 to 1.9 on average; (B) organo-silicon compounds with Si-bonded hydrogen atoms; (C) catalysts which promote the formation of an aliphatic multiple bond by Si-bonded hydrogen; and optionally, (D) agents which slow down the formation of an aliphatic multiple bond by Si-bonded hydrogen at room temperature.

16 Claims, No Drawings

CROSS-LINKABLE COMPOUNDS, OPTIONALLY CONTAINING MQ SILICON RESINS

The invention relates to crosslinkable compositions comprising
($A_1$) organosilicon compounds containing aliphatically unsaturated hydrocarbon radicals
and, if desired,
($A_2$) MQ silicone resin,
(B) organosilicon compounds containing Si-bonded hydrogen atoms,
(C) catalysts which promote the addition of Si-bonded hydrogen onto aliphatic multiple bond, and, if desired,
(D) agents which retard the addition of Si-bonded hydrogen onto aliphatic multiple bond at room temperature
and to their use for producing coatings which repel tacky substances.

EP-B 403890 (Bayer A G; published on 16.03.1994) and the corresponding U.S. Pat. No. 5,077,369, and also EP-A 640662 (Bayer A G; laid open on 01.03.1995) describe addition-crosslinking organopolysiloxane mixtures for producing adhesion-reducing coatings. The organopolysiloxanes present in the mixtures are branched, with the branching sites representing trifunctional monoorganosiloxy groups, so-called T units, and/or tetrafunctional siloxy groups, so-called Q units. In addition they possess triorganosiloxy groups, so-called M units, as end groups, which contain at least one unsaturated hydrocarbon radical.

U.S. Pat. No. 5,082,915 (Shin-Etsu Chemical Company Ltd.; published on 21.01.1992) describes paper-coating compositions which comprise a branched organopolysiloxane having at least two Si-bonded alkenyl groups and at least one SiC-bonded siloxane side chain of the formula —$(CH_2)_m(R^1{}_2SiO)_n$—$SiR^1{}_3$ per molecule, where $R^1$ is a monovalent hydrocarbon radical, preferably a methyl radical, m is an integer from 2 to 8 and n is an integer from 5 to 100.

EP-A 761 790 (Dow Corning Corporation; laid open on Mar. 12, 1997) discloses crosslinkable silicone coating compositions which comprise organopolysiloxanes having Si-bonded vinyl groups or higher alkenyl groups and SiC-bonded groups of the formula —$(CH_2)_nSi(OR)_3$ (where R is a monovalent hydrocarbon radical and n is an integer from 2 to 20).

The use of MQ silicone resins as agents for adjusting the release force in coating compositions is known from U.S. Pat. No. 4,123,604 (Dow Corning Corporation; published on Oct. 31, 1978), EP-B 535 687 (Wacker-Chemie GmbH; published on Jun. 15, 1994) and EP-B 607 869 (Wacker-Chemie GmbH; published on Apr. 5, 1995).

The object was to provide novel compositions based on organosilicon compounds which crosslink in the presence of catalysts by the addition of Si-bonded hydrogen onto aliphatic multiple bond. A further object was to provide novel compositions for the production of coatings which repel tacky substances. Yet another object was to provide abhesive coating compositions which give abrasion-resistant coatings, i.e. which adhere to the substrate such that they cannot be separated by mechanical influences, for example by rubbing, from the substrate, so that they do not become partly detached when carriers located on them and provided with adhesive, such as labels, are peeled off, which would otherwise reduce the bonding strength of the labels. A further object was to provide abhesive coating compositions which give tack-free well-cured coatings. These objects are achieved by the invention.

The invention provides crosslinkable compositions comprising
($A_1$) linear organopolysiloxanes containing aliphatically unsaturated hydrocarbon radicals, of the general formula

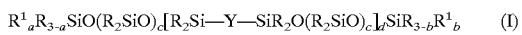

where R can be identical or different and is a monovalent, unsubstituted or halogenated hydrocarbon radical which has from 1 to 18 carbon atoms per radical and is free from terminal aliphatic carbon—carbon multiple bonds,
$R^1$ is a monovalent aliphatically unsaturated hydrocarbon radical having from 2 to 14 carbon atoms per radical,
Y is a divalent organic radical which is free from terminal aliphatic carbon—carbon multiple bonds,
a is 0 or 1,
b is 0 or 1,
and the sum a+b per molecule is 1 or 2,
c is an integer from 1 to 1000 and
d is 0 or an integer from 1 to 10,
and, if desired,
($A_2$) MQ silicone resins which are soluble in ($A_1$), with the proviso that without the use of MQ silicone resins ($A_2$) the sum a+b in formula (I) is on average from 1.3 to 1.9, and that with the use of MQ silicone resins ($A_2$) the sum a+b in formula (I) is on average from 1.0 to 1.9,
(B) organosilicon compounds containing Si-bonded hydrogen atoms,
(C) catalysts which promote the addition of Si-bonded hydrogen onto aliphatic multiple bond,
and, if desired,
(D) agents which retard the addition of Si-bonded hydrogen onto aliphatic multiple bond at room temperature.

The invention also provides a process for producing coatings which repel tacky substances, by applying crosslinkable compositions comprising
($A_1$) linear organopolysiloxanes containing aliphatically unsaturated hydrocarbon radicals, of the general formula

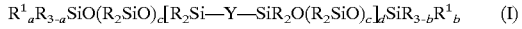

where R, $R^1$, Y, a, b, c and d have the meaning indicated above for them,
and, if desired,
($A_2$) MQ silicone resins which are soluble in ($A_1$),
with the proviso that
without the use of MQ silicone resins ($A_2$) the sum a+b in formula (I) is on average from 1.3 to 1.9, and that with the use of MQ silicone resins ($A_2$) the sum a+b in formula (I) is on average from 1.0 to 1.9,
(B) organosilicon compounds containing Si-bonded hydrogen atoms,
(C) catalysts which promote the addition of Si-bonded hydrogen onto aliphatic multiple bond,
and, if desired,
(D) agents which retard the addition of Si-bonded hydrogen onto aliphatic multiple bond at room temperature
to the surfaces which are to be made repellent to tacky substances and subsequently curing the crosslinkable composition.

The linear organopolysiloxanes ($A_1$) according to the invention, containing aliphatically unsaturated hydrocarbon radicals, preferably possess a viscosity of from 5 to 20,000 mm²/s at 25° C., preferably from 20 to 1000 mm²/s at 25° C. and, with particular preference, from 20 to 500 mm²/s at 25° C.

The organopolysiloxanes according to the invention preferably have iodine numbers of between 1 and 80, preferably between 4 and 15, the iodine number indicating the amount of iodine, in grams, consumed in the course of addition onto the double bond, per 100 rams of organopolysiloxane of the invention that is employed.

Examples of radicals R are alkyl radicals, such as the methyl, ethyl, n-propyl, isopropyl, n-butyl, isobutyl, tert-butyl, n-pentyl, isopentyl, neopentyl and the tert-pentyl radical, hexyl radicals, such as the n-hexyl radical, heptyl radicals, such as the n-heptyl radical, octyl radicals, such as the n-octyl radical and isooctyl radicals such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexadecyl radicals, such as the n-hexadecyl radical, and octadecyl radicals, such the n-octadecyl radical, cycloalkyl radicals, such as the cyclopentyl, cyclohexyl and 4-ethylcyclohexyl radical, cycloheptyl radicals, norbornyl radicals and methylcyclohexyl radicals, aryl radicals, such as the phenyl, biphenylyl, naphthyl and anthryl and phenanthryl radicals; alkaryl radicals, such as o-, m-, p-tolyl radicals, xylyl radicals and ethylphenyl radicals aralkyl radicals, such as the benzyl radical, and also the α- and the β-phenylethyl radical.

The radical R is preferably the methyl radical.

Examples of halogenated radicals R are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Y is preferably a divalent hydrocarbon radical which can contain one or more separate oxygen atoms.

Examples of radicals Y are those of the formula —$CH_2CH_2$—, —$CH(CH_3)$—, —$(CH_2)_4$—, —$(CH_2)_5$—, —$(CH_2)_6$—, —$(CH_2)_8$—, —$(CH_2)_{10}$—, —$(CH_2)_{12}$—, —$(CH_2)_3O(CH_2)_3$—, 1,3-$(CH_2CH_2)_2$ $(C_6H_4)$, 1,4-$(CH_2CH_2)_2(C_6H_4)$, 1,3-$(CH_2CHCH_3)_2(C_6H_4)$, preference being given to the radicals of the formula —$CH_2CH_2$—, —$CH(CH_3)$—, —$(CH_2)_6$—, —$(CH_2)_8$— and particular preference being given to the radical of the formula —$CH_2CH_2$—.

The radicals $R^1$ preferably have a terminal double bond. Examples of radicals $R^1$ are the vinyl, allyl, 3-butenyl, 5-hexenyl, 7-octenyl, 9-decenyl, 11-dodecenyl, 3-allyloxypropyl, 2-(3-vinylphenyl)ethyl and the 2-(4-vinylphenyl)ethyl radical, preference being given to the vinyl and the 5-hexenyl radical and particular preference to the vinyl radical.

If MQ silicone resins ($A_2$) are not used, the organopolysiloxanes ($A_1$) have as end groups on average from 65 to 95 mol-%. of radicals $R^1$, preferably ω-alkenyl end groups (or as end groups from 35 to 5 mol-% of radicals R, preferably methyl end groups), corresponding to an average sum a+b of from 1.3 to 1.9. The sum a+b is preferably on average from 1.3 to 1.8.

If MQ silicone resins ($A_2$) are used, the organopolysiloxanes ($A_1$) have as end groups on average from 50 to 95 mol-% of radicals $R^1$, preferably ω-alkenyl end groups (or as end groups from 50 to 5 mol-% of radicals R, preferably methyl end groups), corresponding to an average sum a+b of from 1.0 to 1.9. The sum a+b is preferably on average from 1.0 to 1.5, in particular from 1.1 to 1.4.

With the compositions according to the invention it is preferred to employ a mixture of different organopolysiloxanes ($A_1$). c is preferably an integer from 10 to 300, preferably from 20 to 150.

d is preferably 0 or an integer from 1 to 3; preferably, d is 0.

Processes for preparing linear organopolysiloxanes of the formula (I) where d is 0 are known to the skilled worker. A preferred process is the acid-catalysed equilibration of polydialkylsiloxanes having alkyl end groups with polydialkylsiloxanes having ω-alkenyl end groups.

Linear organopolysiloxanes of the formula (I) where d is an integer from 1 to 10 and processes for their preparation are described in U.S. Pat. No. 5,057,549 and in the corresponding DE-A 39 14 896.

MQ silicone resins ($A_2$), which are used if desired, are those comprising units of the general formula

$R_3SiO_{1/2}$(IV), $R^1R_2SiO_{1/2}$(V) and $SiO_2$(VI), where R and $R^1$ have the meaning indicated above for them.

The ratio of M units of the formula (IV) and (V) to Q units of the formula (VI) is preferably from 0.5 to 1.5, more preferably from 0.5 to 1.0. The ratio of saturated M units of the formula (IV) to unsaturated M units of the formula (V) is preferably from 5 to 20, more preferably from 5 to 10.

The MQ silicone resins may include small amounts of T units of the formula $RSiO_{3/2}$ and D units of the formula $R_2SiO$.

Processes for preparing the MQ silicone resins ($A_2$) are described in EP-B 535 687, which was mentioned at the outset, and is incorporated herein by reference.

If MQ silicone resins ($A_2$) are used, the MQ silicone resins ($A_2$) are employed in amounts of preferably from 40 to 60% by weight, more preferably from 50 to 55% by weight, based in each case on the overall weight of the constituents ($A_1$) and ($A_2$).

High concentrations of MQ silicone resin lead to greatly increased viscosities, so that when using more than 60% by weight of MQ silicone resin ($A_2$) it is normally no longer possible to do without the addition of solvent.

The use of MQ silicone resins ($A_2$) has the advantage that it is possible to adjust the release force of the abhesive coatings.

In the case of the crosslinkable compositions according to the invention as well it is possible as constituent (B) to use the same organopolysiloxanes, containing Si-bonded hydrogen atoms, which it has been possible to employ in the case of all hitherto known compositions comprising organopolysiloxanes containing aliphatically unsaturated hydrocarbon radicals, such as vinyl groups, organopolysiloxanes containing Si-bonded hydrogen atoms, and catalysts which promote the addition of Si-bonded hydrogen onto aliphatic multiple bond.

The organopolysiloxanes (B) preferably contain at least 3 Si-bonded hydrogen atoms.

As constituent (B) it is preferred to use organopolysiloxanes comprising units of the formula:

$H_eR_fSiO_{\frac{4-(e+f)}{2}}$ (II)

where R has the meaning indicated above for it,
e is 0 or 1,
f is 0, 1, 2 or 3 and
the sum e+f is not greater than 3,
more preferably those of the formula

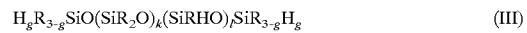

$H_gR_{3-g}SiO(SiR_2O)_k(SiRHO)_lSiR_{3-g}H_g$ (III)

where R has the meaning indicated above for it,
g is 0 or 1, k is 0 or an integer from 1 to 100 and
l is 0 or an integer from 1 to 100,
or organosilicon compounds containing Si-bonded hydrogen atoms as described in the German application with the file reference 196 02 663.6 of the Applicant, or mixtures of the above-mentioned organopolysiloxanes and organosilicon compounds.

Examples of organopolysiloxanes (B) are, in particular, copolymers comprising dimethylhydridosiloxane, methylhydridosiloxane, dimethylsiloxane and trimethylsiloxane units, copolymers comprising trimethylsiloxane, dimethylhydridosiloxane and methylhydridosiloxane units, copolymers comprising trimethylsiloxane, dimethylsiloxane and methylhydridosiloxane units, copolymers comprising methylhydridosiloxane and trimethylsiloxane units, copolymers comprising methylhydridosiloxane, diphenylsiloxane and trimethylsiloxane units, copolymers comprising methylhydridosiloxane, dimethylhydridosiloxane and diphenylsiloxane units, copolymers comprising methylhydridosiloxane, phenylmethylsiloxane, trimethylsiloxane and/or dimethylhydridosiloxane units, copolymers comprising methylhydridosiloxane, dimethylsiloxane, diphenylsiloxane, trimethylsiloxane and/or dimethylhydridosiloxane units and copolymers comprising dimethylhydridosiloxane, trimethylsiloxane, phenylhydridosiloxane, dimethylsiloxane and/or phenylmethylsiloxane units.

Processes for preparing organopolysiloxanes (B), including those organopolysiloxanes (B) of the preferred kind, are generally known.

Organosilicon compounds (B) are preferably employed in amounts of from 0.5 to 6, preferably from 1 to 3, and, with particular preference, from 1.2 to 2.5 gramme atoms of Si-bonded hydrogen per mole of radical $R^1$ in the organopolysiloxanes (A) containing aliphatically unsaturated hydrocarbon radicals.

As catalysts (C) which promote the addition of Si-bonded hydrogen onto aliphatic multiple bond it is also possible in the case of the compositions according to the invention to use the same catalysts which it has also been possible to employ to promote crosslinking in the case of the hitherto known compositions for crosslinking organosilicon compounds containing aliphatic multiple bonds with compounds containing Si-bonded hydrogen. The catalysts (C) preferably comprise a metal from the group of the platinum metals or a compound or a complex from the group of the platinum metals. Examples of such catalysts are metallic and finely divided platinum, which can be on carriers such as silica, alumina or active charcoal, compounds or complexes of platinum, such as platinum halides, e.g. $PtCl_4$, $H_2PtCl_6*6H_2O$, $Na_2PtCl_4*4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6*6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis(gammapicoline)platinum dichloride, trimethylenedipyridineplatinum dichloride, dicyclopentadieneplatinum dichloride, dimethyl sulphoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefin and primary amine or secondary amine or primary and secondary amine in accordance with U.S. Pat. No. 4,292,434, such as the reaction product of platinum tetrachloride, dissolved in 1-octene, with sec-butylamine, or ammonium-platinum complexes in accordance with EP-B 110 370.

Catalyst (C) is preferably employed in amounts of from 5 to 500 ppm by weight (parts by weight per million parts by weight), in particular from 10 to 200 ppm by weight, calculated in each case as elemental platinum metal and based on the overall weight of the organopolysiloxanes (A) and (B).

As agents which retard the addition of Si-bonded hydrogen onto aliphatic multiple bond at room temperature, so-called inhibitors (D), it is also possible in the case of the compositions according to the invention to use, if desired, all inhibitors which it has also been possible to use to date for the same purpose. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond in accordance with U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyl-oct-1-yn-6-en-3-ol, inhibitors in accordance with U.S. Pat. No. 2,476,166, such as a mixture of diallyl maleate and vinyl acetate, and inhibitors in accordance with U.S. Pat. No. 4,504,645, such as maleic monoesters.

The inhibitor (D) is preferably employed in amounts of from 0.001 to 10% by weight, based on the overall weight of the organopolysiloxanes (A) and (B).

Examples of further constituents which can be used in connection with the compositions according to the invention are solvents, adhesion promoters and pigments.

The solvents used if desired in connection with the compositions according to the invention can be the same solvents which it has been possible to use in connection with the hitherto known compositions comprising organopolysiloxanes containing aliphatically unsaturated hydrocarbon radicals, organopolysiloxanes containing Si-bonded hydrogen, and catalysts which promote the addition of Si-bonded hydrogen onto aliphatic double bond. Examples of such solvents are petroleum spirits, for example alkane mixtures having a boiling range from 80° C. to 110° C. at 1012 mbar (abs.), n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used they are judiciously employed in amounts of from 10 to 95% by weight, based on the overall weight of the organopolysiloxanes (A) containing aliphatically unsaturated hydrocarbon radicals.

The sequence when mixing the constituents (A), (B), (C) and, if used, (D) is not actually critical, although for practical purposes it has been found appropriate to add the constituent (C), i.e. the catalyst, last to the mixture of the other constituents.

The crosslinking of the compositions according to the invention takes place preferably at from 50 to 150° C., preferably at from 80 to 150° C. Energy sources used for crosslinking by heating are preferably ovens, for example convection drying ovens, heating tunnels, heated rollers, heated plates or heat rays in the infrared range.

Besides exposure to heat, the compositions of the invention can also be crosslinked by irradiation with ultraviolet light or by irradiation with UW and IR light. The ultraviolet light used is customarily that having a wavelength of 253.7 nm. In commerce there are a large number of lamps which emit ultraviolet light with a wavelength of from 200 to 400 nm, and which preferentially emit ultraviolet light with a wavelength of 253.7 mm.

The compositions according to the invention have the advantage that after crosslinking they give coatings which are resistant to abrasion. In addition, tack-free and well-cured coatings are obtained, so that there is virtually no adverse effect on the bonding strength of the adhesives which come into contact with the coatings.

The application of the compositions according to the invention to the surfaces to be made repellent to tacky substances can be accomplished in any desired manner which is suitable and widely known for the production of coatings from liquid substances, for example by dipping, brushing, pouring, spraying, rolling, printing, for example by means of an offset gravure coating device, by knife coating, or by means of an airbrush.

The surfaces which are to be made repellent to tacky substances and which can be treated in the context of the invention can comprise surfaces of any desired materials which are solid at room temperature and 1012 mbar (abs.). Examples of such surfaces are those of paper, wood, cork and polymer films, for example polyethylene films or polypropylene films, woven and nonwoven fabric of natural or synthetic fibres or glass fibres, ceramic articles, glass, metals, polyethylene-coated paper, and boards, including that of asbestos. The above-mentioned polyethylene can in each case comprise high-pressure, medium-pressure or low-pressure polyethylene. The paper can comprise low-grade paper types, such as absorbent papers, including kraft paper which is raw, i.e. has not been pretreated with chemicals and/or polymeric natural substances, having a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from waste paper, i.e. so-called recycled papers. The paper to be treated in accordance with the invention can also, however, of course comprise high-grade papers, such as low-absorbency papers, sized papers, papers of high freeness value, chemical papers, calendered or glazed papers, glassine papers, parchmentized papers or precoated papers. The boards may also be of low or high grade.

The compositions according to the invention are suitable, for example, for the production of release, backing and interleaving papers, including interleaving papers which are employed in the production of, for example, cast films or decorative films, or of foams, including those of polyurethane. The compositions according to the invention are also suitable, for example, for the production of release, backing and interleaving cards, films and cloths, for treating the reverse sides of self-adhesive tapes or self-adhesive films or the written faces of self-adhesive labels. The compositions according to the invention are additionally suitable for treating packing material, such as that comprising paper, cardboard boxes, metal foils and drums, for example, cardboard, plastic, wood or iron, which is or are intended for the storage and/or transportation of tacky goods, such as adhesives, sticky foodstuffs, for example cakes, honey, sweets and meat, bitumen, asphalt, greased materials and crude rubber. A further example of the use of the compositions according to the invention is the treatment of backings for the transfer of pressure-sensitive adhesive layers in the so-called transfer process.

The compositions according to the invention are suitable for the production of the self-adhesive materials joined to the release paper, both by the off-line method and by the in-line method. In the off-line method, the silicone composition is applied to the paper and crosslinked and then, in a subsequent step, normally after the winding-up of the release paper onto a roll and after storage of the roll, an adhesive film, which lies for example on a label face paper, is applied to the coated paper and the assembly is then pressed together. In the in-line method, the silicone composition is applied to the paper and crosslinked, the silicone coating is coated with the adhesive, the label face paper is then applied to the adhesive, and finally the assembly is pressed together.

Preparing the Organopolysiloxanes (A):

Polymer I:

A mixture of 1200 g of an α,ω-divinylpolydimethylsiloxane having a viscosity of 217 mm$^2$/s at 25° C. and 100 g of a methyl-terminated polydimethylsiloxane having a viscosity of 346 mm$^2$/s at 25° C. is equilibrated to constant viscosity with 50 ppm of phosphonitrilic chloride at 125° C. The catalyst is neutralized, and the crude product is filtered and freed from volatile by-products at 160° C. and 3 hPa. This gives a clear oil having a viscosity of 180 mm$^2$/s at 25° C. and an iodine number of 6.9. The product contains on average 94 mol-% of vinyl end groups (a+b=1.88).

Polymer II:

Analogous repetition of Example 1 with only 700 g of the α,ω-divinylpolydimethylsiloxane gives a polymer having a viscosity of 204 mm$^2$/s at 25° C. and an iodine number of 6.7. The product contains on average 90 mol-% of vinyl end group (a+b 1.80).

Polymer III:

Analogous repetition of Example 1 with only 500 g of the α,ω-divinylpolydimethylsiloxane gives a polymer having a viscosity of 214 mm$^2$/s at 25° C. and an iodine number of 6.0. The product contains on average 86 mol-% of vinyl end groups (a+b=1.72).

Polymer IV:

30 g of 1,3-di(5-hexenyl)tetramethyldisiloxane are equilibrated with 1350 g of a methyl-terminated polydimethylsiloxane having a mean chain length of about 900 siloxy units with catalysis by phosphonitrilic chloride (100 ppm). Workup as in Example 1 gives a clear siloxane polymer having a viscosity of 380 mm$^2$/s at 25° C. and an iodine number of 4.1. The polymer contains on average 83 mol-% of 5-hexenyl groups (a+b=1.66).

Polymer V:

600 g of a siloxane polymer of average composition (HMe$_2$SiO$_{1/2}$)$_{1.8}$ (Me$_3$SiO$_{1/2}$)$_{0.2}$ (Me$_2$SiO)$_{48}$ are mixed with 24 g of 1,5-hexadiene and the mixture is heated to about 60° C. 15 mg of H$_2$PtCl$_6$H$_2$O (dissolved in about 2 ml of isopropanol) are added, after which the internal temperature rises by about 22° C. Volatile constituents are removed at 130° C. and 3 hPa. The resulting product has a viscosity of 182 mm$^2$/s at 25° C. and an iodine number of 6.3. It contains 82 mol-% of 5-hexenyl groups (a+b=1.64).

Polymer VI:

Example 1 is repeated but now employing, instead of 100 g of the methyl-terminated polydimethylsiloxane, 86 g of a methyl-terminated polydimethylsiloxane having a viscosity of 20 mm$^2$/s at 25° C. Workup gives a clear colourless polymer having a viscosity of 108 mm$^2$/s at 25° C. and an iodine number of 7.9. The product (VI) contains on average 77 mol-% of vinyl end groups (a+b=1.54).

Polymer VII:

250 g of an α,ω-divinylpolydimethylsiloxane with an average chain length of 29 siloxy units are equilibrated with 400 g of a methyl-terminated polydimethylsiloxane of viscosity 5000 mm$^2$/s at 25° C. with catalysis by 50 ppm of phosphonitrilic chloride at 145° C. Workup in accordance with Example 1 gives a clear polymer (VII) having a viscosity of 112 mm$^2$/s at 25° C. and an iodine number of 8.7. It contains on average 90 mol-% of vinyl end groups (a+b=1.80).

Polymer VIII:

Example 7 is repeated with 500 g of a methyl-terminated polydimethylsiloxane having a viscosity of 1000 mm$^2$/s at 25° C. rather than 5000 mm$^2$/s. The viscosity of the product (VIII) is now 109 mm$^2$/s at 25° C. with an iodine number of 7.6. It contains on average 83 mol-% of vinyl end groups (a+b=1.66).

Comparison Polymer 1:

Example 8 is repeated with 700 g of a methyl-terminated polydimethylsiloxane having a viscosity of 205 mm$^2$/s at 25° C. instead of the polymer with 5000 mm$^2$/s. Equilibration and workup give a clear polymer having a viscosity of 97 mm$^2$/s at 25° C. and an iodine number of 6.6. The product contains on average 55 mol-% of vinyl end groups per molecule (a+b=1.10).

Comparison Polymer 2:

=α,ω-divinylpolydimethylsiloxane having 98 siloxane units (=chain length 98)

EXAMPLES 1 TO 3 AND COMPARATIVE EXPERIMENTS 1 AND 2

The following formulations (Table 1) are prepared from components A, B, C and D.
(A) alkenyl-functional siloxane: Polymer VI, VII, VIII or Comparison Polymer 1 and 2
(B) H-siloxane crosslinker: polyhydridomethylsiloxane (methyl-terminated) containing 1.54% by weight of Si-bonded hydrogen
(C) catalyst: platinum-1,3-divinyl-1,1,3,3-tetramethyldisiloxane complex dissolved in α,ω-divinylpolydimethylsiloxane (1% Pt content) (so-called Karstedt catalyst in accordance with U.S. Pat. No. 3,775,452)
(D) Inhibitor: 1-ethynylcyclohexanol The components are mixed in the sequence (A)+(D)+(B)+(C).

TABLE 1

| Example | 1 | 2 | 3 | Comparative Experiment 1 | Comparative Experiment 2 |
|---|---|---|---|---|---|
| Polymer | VII | VIII | VI | Comparison Polymer 1 | Comparison Polymer 2 |
| (A) | 100 g | 100 g | 100 g | 100 g | 100 g |
| (B) | 4.5 g | 3.9 g | 4.0 g | 3.4 g | 3.6 g |
| (C) | 1.04 g | 1.04 g | 1.04 g | 1.04 g | 1.04 g |
| (D) | 0.26 g | 0.26 g | 0.26 g | 0.26 g | 0.26 g |
| mol-% of vinyl | 90 | 83 | 77 | 55 | 100 |

The ratio of Si-bonded hydrogen to H$_2$C=CH groups is 2.0. All formulations contain 0.25% of 1-ethynylcyclohexanol and have gel times of >72 h.

The mixtures are knife-coated onto polyester film in a coat thickness of about 4 μm and are cured in a convection oven at 85° C. for 20 seconds. The results are summarized in Table 2.

TABLE 2

| | Extract | Release force [cN/cm] | | | Release force retention |
|---|---|---|---|---|---|
| | [% by wt.] | A 7475 | K 7476 | T 154 | [%] |
| Example 1 | 5.9 | 18 | 11 | 9 | >100 |
| Example 2 | 11.6 | 16 | 8 | 8 | >100 |
| Example 3 | 6.5 | 16 | 9 | 8 | >100 |
| Comparative Experiment 1 | | Silicone coating is soft and tacky | | | |
| Comparative Experiment 2 | 4.1 | 8 | 13 | 4 | >100 |

Extractable fractions are regarded as non-crosslinked constituents (extraction medium: methyl isobutyl ketone)

The release forces relative to the three Tesa adhesive tapes, and the release force retention, were determined in accordance with FINAT 10 and 11 printed in "Suppliers and Users Technical Manual", June 1980, pages 21 to 24, using customary commercial self-adhesive (pressure-sensitive) adhesive tapes 2.5 cm wide—"Tesafilm A 7475", "Tesafilm K 7476" and "Tesafilm T 154" (from Beiersdorf A G, Hamburg, F R G; the "Tesa" part of the word is a registered trademark).

The comparison shows that an inadequate content of reactive alkenyl groups (<65 mol-%) in the linear organopolysiloxane (A) leads to inadequate curing (Comparative Experiment 1).

The quality of the substrate adhesion of the cured films is determined relative to a number of substrates in the abrasion test. To determine the abrasion the coated substrates are clamped between thumb and forefinger. Then, with the finger of the other hand, rubbing with strong pressure is carried out a number of times rapidly backwards and forwards over the taut substrate. If the adhesion of the silicone film to the substrate surface is poor, some of the silicone coating is abraded. Depending on its extent, the abrasion is evaluated using the ratings 1–6, where a completely undamaged surface is given the rating 1 and complete abrasion is awarded the rating 6.

The results are summarized in Table 3.

TABLE 3

| Example | 1 | 2 | 3 | Comparative Experiment 2 | Comparative Experiment 1 |
|---|---|---|---|---|---|
| Bosso 925 | 1 (1) | 1 (1) | 1 (1) | 1-2 (1-2) | 6 |
| Cham 697 | 2-3 (2-3) | 1-2 (1-2) | 1-2 (1-2) | 3 (4-5) | 6 |
| Cham 699 | 1-2 (1-2) | 1 (1-2) | 1 (1) | 2-3 (2-3) | 6 |
| Polyester | 1 (1) | 1 (1) | 1 (1) | 1 (2-3) | 6 |

Assessment of abrasion: immediate (after 5 days) Although Comparative Experiment 2 also shows good curing, the formulations according to the invention are considerably superior in abrasion behaviour.

EXAMPLE 4

MQ resin formulations are prepared at various concentrations from the following components:
A$_1$ α,ω-divinyldimethylpolysiloxane comprising 1.2 mol of vinyldimethylsiloxy, 0.8 mol of trimethylsiloxy and 27 mol of dimethylsiloxy units, i.e. 60 mol-% of the end groups are vinyl groups (a+b=1.2).
A$_2$ MQ resin comprising (CH$_3$)$_3$SiO$_{1/2}$ units (M$_1$), CH$_2$=CH(CH$_3$)$_2$SiO$_{1/2}$ units (M$_2$) and SiO$_2$ units (Q), where the ratio of the sum of the units M$_1$+M$_2$ to the Q units is 0.7 and the ratio of $M_1$ units to $M_2$ units is 1:7.3 (1400 g/C=C double bond).

|  | CRA 1 | CRA 2 |
|---|---|---|
| $A_1$ | 50 g | 45 g |
| $A_2$ | 50 g | 55 g |
| iodine number | 16.0 | 16.2 |
| viscosity | 1200 mm²/s (25° C.) | 6300 mm²/s (25° C.) |
| mixed with: |  |  |
| crosslinker B | 10.2 g | 10.4 g |
| catalyst C | 1.1 g | 1.1 g |
| inhibitor D | 0.1 g | 0.1 g |

B) H-siloxane comprising methylhydridosiloxane and trimethylsiloxane units with 15.4 g of Si-bonded hydrogen/kg C) Platinum-1,3-divinyl-1,1,3,3-tetramethyldisiloxane complex (so-called Karstedt catalyst in accordance with U.S. Pat. No. 3,775,452) dissolved in α,ω-divinyldimethylpolysiloxane, having a viscosity of 1000 mm²/s at 25° C. (1.0% Pt content)

D) 1-Ethynylcyclohexanol.

The freshly prepared, ready-to-use compositions contain 2.5 g of Si-bonded hydrogen per mole of double bond. They are coated with a glass rod in a coat thickness of 4 μm onto a number of substrates and cured in a convection oven at 85° C. Then the abrasion behavior is tested.

The quality of the substrate adhesion of the cured films is determined relative to a number of substrates in the abrasion test. To determine the abrasion the coated substrates are clamped between thumb and forefinger. Then, with the finger of the other hand, rubbing with strong pressure is carried out a number of times rapidly backwards and forwards over the taut substrate. If the adhesion of the silicone film to the substrate surface is poor, some of the silicone coating is abraded. Depending on its extent, the abrasion is evaluated using the ratings 1–6, where a completely undamaged surface is given the rating 1 and complete abrasion is awarded the rating 6.

The results are summarized in Tables 4 and 5.

TABLE 4

|  | Abrasion test, immediate | | Abrasion test, 2 weeks | |
|---|---|---|---|---|
| 20 seconds/85° C.: | CRA 1 | CRA 2 | CRA 1 | CRA 2 |
| Paper 925 (from BOSSO) | 1 | 1 | 1 | 1 |
| HDPE film Q24000 (from 4P Folie) | 1 | 1 | 1 | 1 |
| Polyester film (from Hoechst) | 1 | 1 | 1 | 1 |

TABLE 5

|  | Abrasion test, immediate | | Abrasion test, 2 weeks | |
|---|---|---|---|---|
| 30 seconds/85° C.: | CRA 1 | CRA 2 | CRA 1 | CRA 2 |
| Paper Algrosol 1 | 1 | 1 | 1 | 1 |
| Paper 697 - 125 g/m² (from Cham) | 1 | 1 | 1 | 1 |
| Paper 699 - 125 g/m² (from Cham) | 1 | 1 | 1 | 1 |

1=no abrasion–6=complete abrasion
The coatings adhere perfectly to all substrates.

COMPARATIVE EXPERIMENT 3

A commercial resin formulation (CRA 17 obtainable from Wacker-Chemie GmbH) is mixed 1:1 with an α,ω-divinyldimethylpolysiloxane having a viscosity of 180 mm²/s at 25° C. and the mixture is blended with crosslinker (B) to an equal SiH/C=C ratio as described in Example 4. Components (C) and (D) are added in exactly the same concentrations as described in Example 4.

The freshly prepared composition is coated with a glass rod in a coat thickness of 4 μm onto a number of substrates and cured in a convection oven at 85° C. The substrate adhesion is determined in the abrasion test as described in Example 4. The results are summarized in Tables 6 and 7.

TABLE 6

|  | Abrasion test | |
|---|---|---|
| 20 seconds/85° C. | immediate | after 2 weeks |
| Paper 925 (from Bosso) | 1 | 1–2 |
| HDPE film Q2400 (from 4P Folie) | 1 | 4–5 |
| Polyester film (from Hoechst) | 5 | 5 |

TABLE 7

|  | Abrasion test | |
|---|---|---|
| 30 seconds/85° C. | immediate | after 2 weeks |
| Paper Algrosol 1 | 5 | 5 |
| Paper 697 - 125 g/m² (from Cham) | 5–6 | 6 |
| Paper 699 - 125 g/m² (from Cham) | 5 | 5–6 |

In almost all cases the substrate adhesion is very poor and the coating is unusable.

What is claimed is:

1. A crosslinkable composition comprising:

($A_1$) linear organopolysiloxanes containing aliphatically unsaturated hydrocarbon radicals, of the general formula

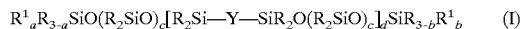

$$R^1{}_aR_{3-a}SiO(R_2SiO)_c[R_2Si-Y-SiR_2O(R_2SiO)_c]_dSiR_{3-b}R^1{}_b \quad (I)$$

where each R independently is identical or different and is a monovalent, unsubstituted or halogenated hydrocarbon radical which has from 1 to 18 carbon atoms per radical and is free from terminal aliphatic carbon—carbon multiple bonds, $R^1$ is a monovalent aliphatically unsaturated hydrocarbon radical having from 2 to 14 carbon atoms per radical, Y is a divalent organic radical which is free from terminal aliphatic carbon—carbon multiple bonds, a is 0 or 1, b is 0 or 1, and the sum a+b per molecule is 1 or 2, c is an integer from 1 to 1000 and d is 0 or an integer from 1 to 10, with the proviso that without the use of MQ silicone resins ($A_2$) the sum a+b in formula (I) is on average from 1.3 to 1.9, and that with the use of MQ silicone resins ($A_2$) the sum a+b in formula (I) is on average from 1.0 to 1.9.

2. The crosslinkable composition of claim 1, wherein $R^1$ is a vinyl radical.

3. The crosslinkable composition of claim 1, wherein d is 0.

4. The crosslinkable composition of claim 2, wherein d is 0.

5. The crosslinkable composition of claim 1, wherein said MQ silicone resins ($A_2$) comprise units of the general formula $$R_3SiO_{1/2} (IV), R^1R_2SiO_{1/2} (V) \text{ and } SiO_2 (VI),$$

where R and $R^1$ have the meaning previously indicated, and the ratio of M units of the formulae (IV) and (V) to Q units of the formula (VI) is from 0.5 to 1.5 and the ratio of saturated M units of the formula (IV) to unsaturated M units of the formula (V) is from 5 to 20.

6. The crosslinkable composition of claim 2, wherein said MQ silicone resins ($A_2$) comprise units of the general formula $$R_3SiO_{1/2} (IV), R^1R_2SiO_{1/2} (V) \text{ and } SiO_2 (VI),$$

where R has the meaning previously indicated, wherein $R^1$ is vinyl, and the ratio of M units of the formulae (IV) and (V) to Q units of the formula (VI) is from 0.5 to 1.5 and the ratio of saturated M units of the formula (IV) to unsaturated M units of the formula (V) is from 5 to 20.

7. The crosslinkable composition of claim 3, wherein said MQ silicone resins ($A_2$) comprise units of the general formula $$R_3SiO_{1/2} (IV), R^1R_2SiO_{1/2} (V) \text{ and } SiO_2 (VI),$$

where R has the meaning previously indicated, $R^1$ is a monovalent aliphatically unsaturated hydrocarbon radical having from 2 to 14 carbon atoms per radical, and the ratio of M units of the formulae (IV) and (V) to Q units of the formula (VI) is from 0.5 to 1.5 and the ratio of saturated M units of the formula (IV) to unsaturated M units of the formula (V) is from 5 to 20.

8. The crosslinkable composition of claim 4, wherein said MQ silicone resins ($A_2$) comprise units of the general formula $$R_3SiO_{1/2} (IV), R^1R_2SiO_{1/2} (V) \text{ and } SiO_2 (VI),$$

where R and $R^1$ have the meaning previously indicated, and the ratio of M units of the formulae (IV) and (V) to Q units of the formula (VI) is from 0.5 to 1.5 and the ratio of saturated M units of the formula (IV) to unsaturated M units of the formula (V) is from 5 to 20.

9. A process for producing coatings which repel tacky substances, said process comprising applying the crosslinkable compositions of claim 1 to the surfaces which are to be made repellent to tacky substances, and curing the crosslinkable composition.

10. A process for producing coatings which repel tacky substances, said process comprising applying the crosslinkable compositions of claim 2 to the surfaces which are to be made repellent to tacky substances, and curing the crosslinkable composition.

11. A process for producing coatings which repel tacky substances, said process comprising applying the crosslinkable compositions of claim 3 to the surfaces which are to be made repellent to tacky substances, and curing the crosslinkable composition.

12. A process for producing coatings which repel tacky substances, said process comprising applying the crosslinkable compositions of claim 4 to the surfaces which are to be made repellent to tacky substances, and curing the crosslinkable composition.

13. A process for producing coatings which repel tacky substances, said process comprising applying the crosslinkable compositions of claim 5 to the surfaces which are to be made repellent to tacky substances, and curing the crosslinkable composition.

14. A process for producing coatings which repel tacky substances, said process comprising applying the crosslinkable compositions of claim 6 to the surfaces which are to be made repellent to tacky substances, and curing the crosslinkable composition.

15. A process for producing coatings which repel tacky substances, said process comprising applying the crosslinkable compositions of claim 7 to the surfaces which are to be made repellent to tacky substances, and curing the crosslinkable composition.

16. A process for producing coatings which repel tacky substances, said process comprising applying the crosslinkable compositions of claim 8 to the surfaces which are to be made repellent to tacky substances, and curing the crosslinkable composition.

* * * * *